United States Patent Office 2,853,934
Patented Sept. 30, 1958

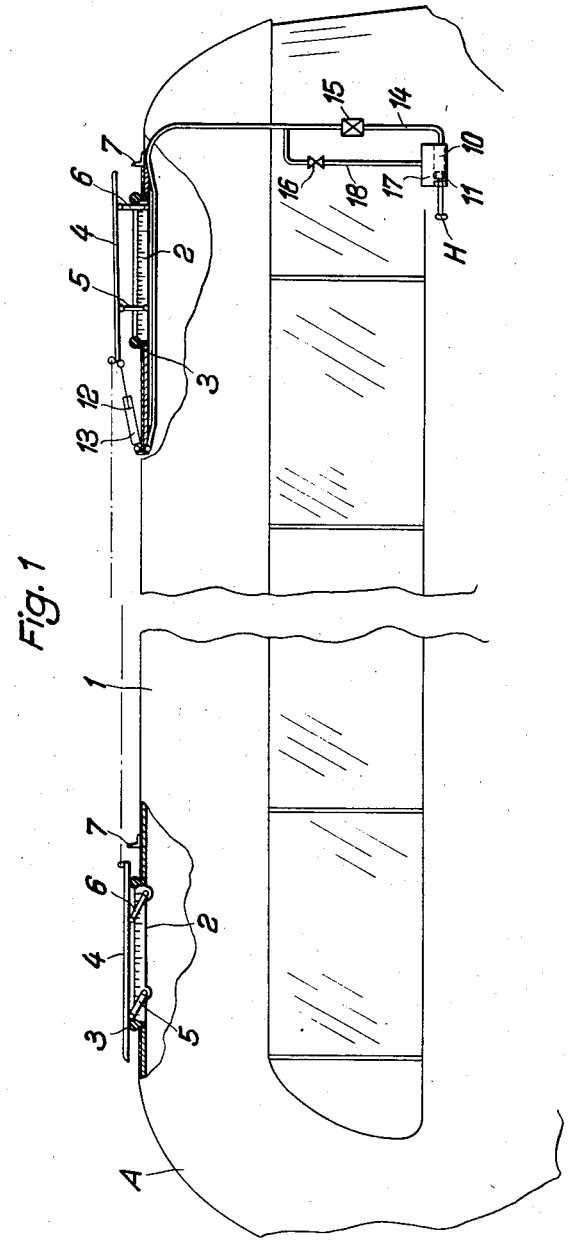

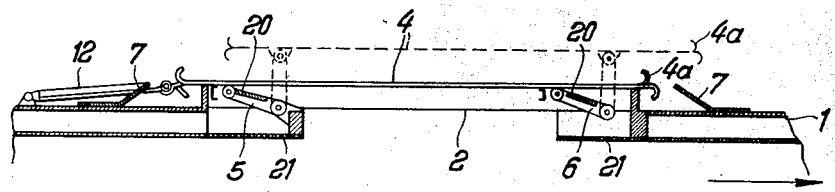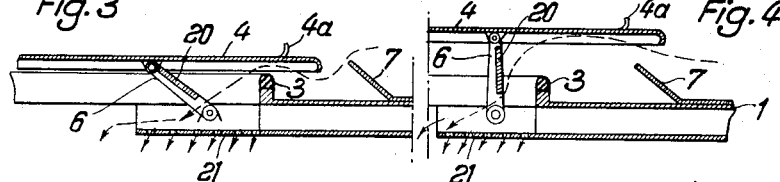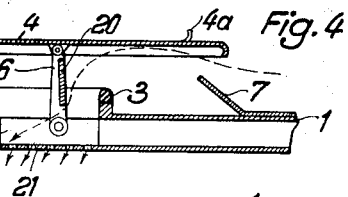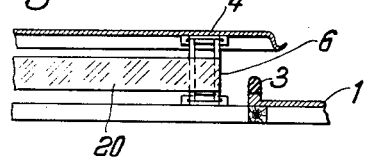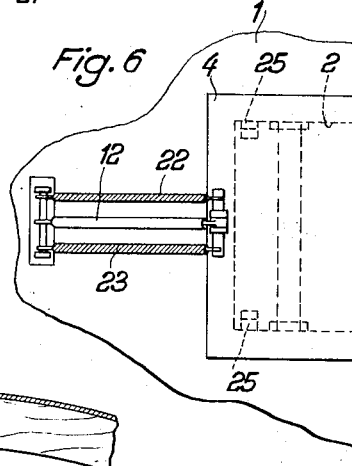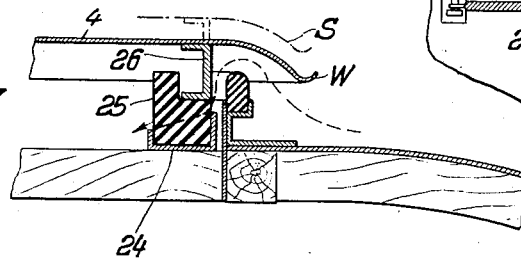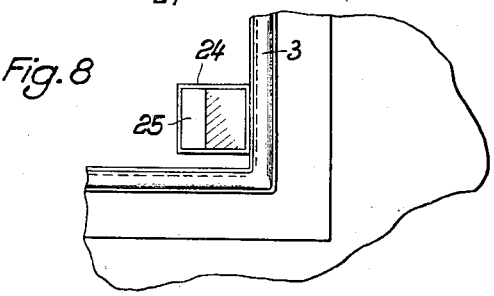

2,853,934

VENTILATING CONTRIVANCE FOR PASSENGER VEHICLES

Willi Hohmann, Wolfenbuttel, Germany

Application November 12, 1953, Serial No. 391,651

Claims priority, application Germany December 22, 1952

6 Claims. (Cl. 98—13)

The present invention relates to ventilating means, and is particularly directed to a novel type of ventilating contrivance for passenger vehicles, such as busses and the trailers of busses, or rail coaches and the like.

The ventilating contrivance of the invention is so devised that it produces highly satisfactory results even at high outside temperatures, and at low driving speed, and independent of the direction of the wind, and that it causes no disturbing draughts within the vehicle, and can remain in opened up ventilating position, at least to a certain extent, even on rainy days.

Furthermore, the ventilating contrivance of the invention is of simple and reliable construction and can be actuated from the driver's seat in the simplest way, and without making it necessary for the driver to take his eyes from the road.

The invention resides essentially in the feature that the roof of the vehicle is provided with one or a plurality of ventilating openings, and that the liftable covering plates of these ventilating openings are adapted for being lifted to ventilating position by simple means actuatable from the driver's seat in such a way that the air can flow from all sides and in perfectly controlled manner into and out of the ventilating openings, while simultaneously the entering of rain into the openings is reliably prevented.

Additional features and advantages of the invention will be understood from a consideration of the following detailed description taken in connection with the accompanying drawings, forming a part of this specification, and in which an embodiment of the invention has been shown by way of illustration. However, I wish to say that the invention is not confined to any strict conformity with the showing of the drawings, but may be changed or modified, so long as such changes or modifications mark no material departure from the salient features of the invention as expressed in the appended claims.

In the drawings, in which like parts are referred to by the same reference numerals, Fig. 1 is a fractional side view of the upper portion of a bus, with portions of the roof broken away to show the ventilating means and the actuating means of the latter;

Fig. 2 is a ventilating contrivance, as illustrated in Fig. 1, on an enlarged scale;

Figs. 3 and 4 are fractional sectional views of the ventilating contrivance in, respectively, almost closed, and completely opened up position;

Fig. 5 is a detail view, showing the wind deflecting plates provided between the lifter arms;

Fig. 6 is a detail view, showing how the hydraulic piston is rotatably coupled to the ventilating plate, while the cylinder of the hydraulic piston is rotatably secured to the roof of the vehicle;

Fig. 7 is a sectional detail view, showing how the spacing members are supported by the supporting members in winter ventilating position;

Fig. 8 is a top view of the supporting members.

Referring now to the drawings in detail, the reference numeral 1 designates the roof of a motor vehicle, for instance a bus, provided with either one or a plurality of ventilating openings 2 which have their edges covered up by the rubber packing means 3 (see Fig. 1). The openings 2 are closed by plates 4, consisting of light metal or of some other suitable substance, such as safety glass or transparent plastic material. When the ventilating means are in closed position, the ventilating plates 4 rest upon the rubber packing means 3 which, depending upon the size of the ventilating means, may project to some extent above the outer surface of the roof, preventing in this way rain-water from entering the interior of the vehicle.

The ventilating plates 4 can be completely lifted from the packing means 3 by two pairs of guide arms 5, 6. When the ventilating plates are in their uppermost position, the guide arms 5, 6 extend in vertical direction. The actuation of the ventilating plates 4 is effected by actuating means actuatable from the driver's seat.

In the embodiment illustrated in the drawings the ventilating plates are lifted and lowered by hydraulic means. But it is also possible to devise the construction in such a way that actuation from the driver's seat with the aid of pneumatic or electric means is thereby rendered possible. Depending upon the degree of ventilation required, the plates 4 can be adjusted at any desired height between closing position and maximum opening position, so that the driver or conductor of a bus or rail coach is enabled to adjust from the driver's seat, through light pressure exerted upon a lever, any required size of ventilating gap in accord with the outside temperature and with the speed at which the vehicle is travelling. With the ventilating plates 4 in their uppermost position, the air can, when the vehicle is not moving, flow in and out through the openings 2 from both sides, from the front and from the rear, so that it is unimportant in which direction the wind is blowing. The same is the case when the vehicle is moving at moderate speed.

In order to prevent the air flowing in through the opening 2 from causing disturbing air currents in the interior of the vehicle, the invention includes a system of air trapping, air deflecting, and air distributing means, which are arranged partly before and partly behind the air gaps formed between liftable and immovable roof portions.

In the embodiment illustrated in Fig. 2 the edges of the liftable ventilating plate 4 which extend in a direction transverse to the direction of motion of the vehicle are provided with upwardly projecting ledges 4a which guide the rain-water, blown by the wind along the ventilating plate 4, into laterally positioned rain gutters.

The invention further provides a transversely extending rain-and-wind shield 7 which extends, viewed in the direction of movement of the vehicle, in the front of the plate 4 in a rearwardly inclined direction to such a height that the shield projects somewhat above the plate 4 when the plate is in the closed position and projects beneath the plate 4 when the plate is in the fully lifted or raised position. If the vehicle in question is a rail coach which has at times one of the ledges 4a, and at times the other one of the ledges 4a positioned at the forward end of the vehicle (seen in the direction of motion), it is of course necessary to provide the rain-and-wind shield 7 before both of the ledges 4a.

The rain-and-wind shield 7 does not only prevent torrential rain from entering the ventilating gap between the plate 4 and the roof 1, but also deflects the driving wind in upward direction, so that the driving wind can likewise not enter the ventilating gap, provided that the liftable plate 4 is limited merely to such an extent (see Fig. 3) as is necessary for the replacement of the used up breathing air within the vehicle by fresh air from the outside. The result is that circulation without draught takes place from the sides and through the rear end of the ventilating gap.

But also when the liftable plate 4 is in its completely uplifted position (as shown in Fig. 4), the rearwardly ascending windshield 7 deflects the driving wind in upward direction. Whereupon its force is broken at the underside of the plate 4.

An additional deflecting effect is obtained by the provision of a baffle plate or deflecting plate 20 arranged between the guide arms or lifting arms 5, 6, as indicated in Figs. 3 to 5. The deflecting plate 20 forces the energy of the driving wind in such direction that the passengers in the vehicle are not molested by it. As the plate 20 is arranged between the lifting arms 5, 6, such plate moves, when the ventilating plate 4 is lifted from the closing position, together with the arms 5, 6 from a position corresponding approximately to the direction of the driving wind, gradually more and more to a position in which the plate 20 extends in a direction vertical to the direction of the driving wind. The result of this arrangement is that the deflecting and baffling effects increase in conformity with the extent to which the ventilating plate 4 is lifted from the opening in the vehicle roof and vice versa. This very simple automatic adjustment of the deflecting plate 20 to the size of the air-opening, and as a consequence, also the volume of the driving wind flowing into the air-opening, is an important advantage of the present invention. By changing the plate 20 from a horizontal position to a vertical position, there is effected an increased airflow into the vehicle.

The latter deflecting effect can be increased still further if underneath the pair of lifting arms 6 (and perhaps also the pair of lifting arms 5) a perforated partition 21 is arranged which divides up the current of air and simultaneously hides from view the lifter arms 5, 6 which support the ventilating plate 4.

Fig. 6 shows how the ventilating plate 4 may be lifted by means of a hydraulic piston 12, operable from the driver's seat, and having its piston rod rotatably coupled to the ventilating plate 4, and its cylinder to the roof 1, and which against the closing pull, exerted by one or a pair of laterally positioned tension springs 22, 23, lifts the ventilating plate 4 to any required height between its two final positions.

In order to facilitate for the driver of the vehicle the adjustment of the ventilating gap at its smallest width, at which merely the replacement of used up breathing air by fresh air takes place, the invention provides the ventilating means within the opening 2 with a plurality of small brackets 24, for the arrangement therein of rubber supporting members 25 of such height that the aforesaid gap of smallest width is adjusted as soon as the liftable plate 4 has been lowered to such an extent that the spacing members 26 of the liftable plate 4 come to rest on the rubber supporting members 25.

As, naturally, the need for fresh air is greater during the summer than during the winter, the invention provides the rubber supporting members 25 with two supporting surfaces of different height, so that according to requirements either the lower one or the higher one of the supporting surfaces can be arranged in bearing position. The result is a summer ventilating position S, and a winter ventilating position W of the liftable plate 4 (see Fig. 7).

According to the invention the spacing members 26 of the liftable plate 4 consist of profiled beams which form the framework of the liftable plate, and which extend along the entire length of the opening 2. These spacing beams 26 serve simultaneously for the laterally positioned and longitudinally extending (seen in the direction of motion) ventilating gaps as deflecting members for the fresh air entering through these gaps, and thus reduce (particularly when the ventilating plate 4 is arranged in its winter-ventilating position W) the energy of flow of the air to such a degree that disturbing draughts are thereby prevented (see Fig. 7).

An example of a hydraulically operated ventilating device is shown on the right hand side of Fig. 1. The actuating means of this device are arranged in the vicinity of the driver's seat, and consist of an oil pump 10 of per se known construction whose piston 11 may be adapted for actuation by foot or by hand, as illustrated in the drawing at H. The hydraulic piston 12 is rotatably coupled to the ventilating plate 4, while the cylinder 13 of the hydraulic piston is rotatably supported on the roof 1 of the vehicle. Arranged in the oil duct 14 is a non-return valve 15, so that the oil in the pipe behind the valve 15 is kept under pressure with the result that the ventilating plate 4 is thereby maintained in its temporarily adjusted position. For moving the ventilating plate into closing position, the oil is, through opening of a valve 16, let out of the portion of the oil pipe positioned behind the valve 15 into a branch pipe 18 leading to the oil reservoir 17 of the oil pump 10.

If a plurality of ventilating contrivances are to be arranged in the roof of a vehicle, direct actuation by the oil pressure pump is necessary merely for the ventilating contrivance positioned closest to the driver's seat, while the other ventilating contrivances may be coupled to that directly actuated ventilating contrivance by means of rods, or a chain pull or cable pull 30. But it is also possible to actuate every single one of a plurality of ventilating contrivances by the same oil pressure pump, if for every ventilating contrivance special actuating means are provided behind the pump.

What I claim as new and desire to secure by Letters Patent of the United States is:

1. A ventilating assembly for closed passenger vehicles, such as busses, trailers, rail coaches and the like comprising means defining at least one ventilating opening in the roof of the vehicle, a liftable covering for the said opening, lifting means operatively connected to the covering and to the vehicle roof to lift the covering vertically to a ventilating position, actuating means connected to the liftable covering and operable from a remote location to lift the covering with the assistance of the lifting means to a desired ventilating position, wind deflecting means arranged longitudinally of the direction of movement of the vehicle beneath the liftable covering behind the longitudinally extending gaps formed between the roof and the liftable covering when such covering is lifted into ventilating position, such wind deflecting means including a pair of oppositely disposed longitudinally extending elongated U-shaped beams having one of their projecting flanges fastened to the underside of the liftable covering a plurality of brackets fastened to the vehicle roof and projecting into the ventilating opening, and a plurality of supporting members exchangably and adjustably arranged upon the brackets within the ventilating opening so that lowering of the liftable covering with the aid of the actuating means from a maximum ventilating position moves said U-shaped beams automatically into contact with said plurality of supporting members and thereby limits the downward movement of said liftable cover to a predetermined ventilating position, the said supporting members consisting of rubber and being provided with a plurality of supporting surfaces at different heights of said supporting members.

2. A ventilating assembly for closed passenger vehicles, such as busses, trailers, rail coaches and the like comprising means defining at least one ventilating opening in the roof of the vehicle, at least one cover means liftable from said opening on all sides in a vertical direction, lifting elements within the opening in the vehicle roof operatively connected to the cover means and to the vehicle roof, deflecting surfaces carried by such lifting elements in such a fashion that the deflecting surfaces change alternately from a horizontally disposed position to a vertically disposed position when the lifting elements move from the closed to the open position for deflecting the outside air entering beneath the lifted cover means into the vehicle, remotely located power actuated control means directly connected to the cover means and to the roof of the vehicle coacting with said lifting elements through said cover means to move such lifting elements, and at least one hydraulic piston defining the control means connected to the cover means and the vehicle roof, and tension springs fastened to the cover means and the vehicle roof serving to urge the cover means in closing direction, the hydraulic piston functioning to move the cover means in opening direction against the action of the tension springs.

3. A ventilating assembly as defined in claim 2 wherein the vehicle roof is provided with a plurality of ventilating openings and a cover means for each opening, the hydraulic piston being connected to but one cover means and a movement transmitting member connected to such cover means and the other cover means so that movement of such cover means is imparted to the other cover means.

4. A ventilating assembly for closed passenger vehicles, such as busses, trailers, rail coaches and the like comprising at least one ventilating opening in the roof of the vehicle, at least one cover means for opening and closing the said opening, a plurality of levers pivotally mounted in pairs on the roof and substantially within said opening at opposite sides thereof for connecting the roof with said cover means, adjustable means for pivoting the levers simultaneously to lift and lower the cover means to a plurality of positions and to move the same intermediate a closed position, a plurality of intermediate open positions and a fully lifted position, and in each position being adapted to maintain said cover means parallel to the edges of said opening, deflecting surfaces connecting each pair of said levers to each other and extending transversely to the longitudinal direction of said vehicle, said levers and said deflecting surfaces thereon extending within a substantially horizontal plane when the cover means is in the closed position and within an inclined plane when said cover means is in one of said intermediate positions, and within a substantially vertical plane when said cover means is in the fully lifted position, said deflecting surfaces being adapted to receive and to be acted upon by the outside air flowing substantially in the longitudinal direction of said vehicle when said cover means is lifted from the closed position and adapted to be increasingly acted upon when said cover means is being lifted toward the fully lifted position.

5. A ventilating assembly as claimed in claim 4, further including remotely located power actuated control means connected to the cover means for pivoting the levers, said deflecting surfaces being mounted on said levers so as to be pivotable therewith.

6. A ventilating assembly as claimed in claim 4, further including a wind and rain deflecting plate mounted on the roof of the vehicle forwardly of the ventilating opening and being inclined upwardly and rearwardly and being of such height that, when the cover means is lifted a small amount, the deflecting plate covers the ventilating gap formed between the cover means and the vehicle roof forwardly of said opening, the said deflecting plate preventing any rain driven by the wind along the vehicle roof in the longitudinal direction thereof from entering into said opening in any open position of the cover means.

References Cited in the file of this patent

UNITED STATES PATENTS

| | | |
|---|---|---|
| 542,018 | Hirt | July 2, 1895 |
| 722,539 | Rushton | Mar. 10, 1903 |
| 874,164 | Cibulas | Dec. 17, 1907 |
| 1,860,061 | Tappert | May 24, 1932 |
| 2,328,659 | McKenna | Sept. 7, 1943 |
| 2,337,632 | Winser | Dec. 28, 1943 |

FOREIGN PATENTS

| | | |
|---|---|---|
| 15,382 | Great Britain | 1905 |
| 400,726 | Great Britain | Nov. 2, 1933 |